United States Patent
Walker (12)

(10) Patent No.: US 8,824,838 B2
(45) Date of Patent: *Sep. 2, 2014

(54) INTEGRATED CIRCUIT FOR FACILITATING OPTICAL COMMUNICATION BETWEEN ELECTRONIC DEVICES

(75) Inventor: Richard C. Walker, Palo Alto, CA (US)

(73) Assignee: Corning Cable Systems LLC, Hickory, NC (US)

( * ) Notice: Subject to any disclaimer, the term of this patent is extended or adjusted under 35 U.S.C. 154(b) by 319 days.

This patent is subject to a terminal disclaimer.

(21) Appl. No.: 13/311,540

(22) Filed: Dec. 5, 2011

(65) Prior Publication Data

US 2012/0141064 A1 Jun. 7, 2012

Related U.S. Application Data

(60) Provisional application No. 61/420,454, filed on Dec. 7, 2010.

(51) Int. Cl.
*G02B 6/12* (2006.01)
*G02B 6/36* (2006.01)
*G06F 13/38* (2006.01)
*G06F 13/40* (2006.01)

(52) U.S. Cl.
CPC .......... *G06F 13/385* (2013.01); *G06F 13/4086* (2013.01)
USPC .............................................. 385/14; 385/88

(58) Field of Classification Search
USPC ................................................ 385/14, 88–94
See application file for complete search history.

(56) References Cited

U.S. PATENT DOCUMENTS

| | | | |
|---|---|---|---|
| 7,324,757 B2 | 1/2008 | Wilson et al. | 398/116 |
| 8,083,417 B2 * | 12/2011 | Aronson et al. | 385/92 |
| 8,403,571 B2 * | 3/2013 | Walker | 385/88 |
| 8,534,931 B2 * | 9/2013 | Miller | 385/92 |
| 8,712,196 B2 * | 4/2014 | Shang et al. | 385/12 |
| 2007/0122086 A1 | 5/2007 | Lin | 385/88 |
| 2007/0237470 A1 | 10/2007 | Aronson et al. | 385/101 |

OTHER PUBLICATIONS

Patent Cooperation Treaty, International Search Report, Apr. 10, 2012, 3 pages.

* cited by examiner

*Primary Examiner* — Daniel Petkovsek (57) ABSTRACT

Active optical cable assemblies, and systems, methods, and adapter modules and integrated circuits for facilitating communication between a host and a client device over a fiber optic cable are disclosed. In one embodiment, an active optical cable assembly includes a fiber optic cable having at least one optical fiber, a host active circuit, a client active circuit, a host connector, and a client connector. Upon a connection between the host active circuit and a host device, the client termination switch closes to couple the client termination impedance to the ground reference potential. Upon a connection between the client active circuit and a client device, the host termination switch closes to the couple the host termination impedance to the ground reference potential. In another embodiment, a method includes enabling a host termination impedance upon a connection of an active optical cable to a client device.

16 Claims, 6 Drawing Sheets

INTEGRATED CIRCUIT FOR FACILITATING OPTICAL COMMUNICATION BETWEEN ELECTRONIC DEVICES

RELATED APPLICATIONS

This application claims the benefit of priority under 35 U.S.C. §119 of U.S. Provisional Application Ser. No. 61/420,454 filed on Dec. 7, 2010 the content of which is relied upon and incorporated herein by reference in its entirety.

BACKGROUND

1. Field

The present disclosure generally relates to an integrated circuit along with apparatuses, systems, and methods using the circuit for facilitating optical communication between electronic devices.

2. Technical Background

Fiber optic cables are an attractive alternative to bulky traditional conductor cables, especially as data rates increase. As the use of fiber optics migrates into numerous consumer electronics applications, such as connecting computer peripherals by the use of fiber optic cable assemblies, there will be a consumer driven expectation for cables having improved performance, compatibility with future communication protocols, and a broad range of use. For example, it is likely that consumer demand will be for a fiber optic cable that is compatible with universal serial bus specification version 3.0 (USB 3.0). However, due to handshaking protocols within USB 3.0 and the nature of laser diodes and fiber optic cables, current fiber optic USB cables cause client and/or host devices to become disabled upon connection of the fiber USB cables to the client and/or host device.

Accordingly, alternative fiber optic cable assemblies, as well as apparatuses, systems and methods for facilitating communication between electronic devices, are desired.

SUMMARY

Embodiments of the present disclosure relate to integrated circuits for active optical cable assemblies and, more specifically, active optical cable assemblies configured to enable communication between two or more electronic devices using a communications standard. Generally, the embodiments described herein use an integrated circuit for enabling fiber optic cable assemblies to be utilized in conjunction with the USB 3.0 standard by controllably enabling host and/or client terminations of host and/or client active circuits. Embodiments also relate to methods, systems, and adapter modules using integrated circuits for facilitating communication between electronic devices.

Disclosed in one embodiment is an integrated circuit for facilitating communication between a host device and a client device over a fiber optic cable comprising an optical fiber, the integrated circuit including a termination impedance coupled to a device input line, and a termination switch coupled to the termination impedance and a ground reference potential, so that when the integrated circuit is connected to a host device, the termination switch closes upon a connection between a client-side integrated circuit and a client device to couple the termination impedance to the ground reference potential; and when the integrated circuit is connected to a client device, the termination switch closes upon a connection between a host-side integrated circuit and a host device to couple the termination impedance to the ground reference potential.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

The components of the following figures are illustrated to emphasize the general principles of the present disclosure and are not necessarily drawn to scale. The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Some aspects of the present disclosure are directed to active optical cable assemblies comprising a client active circuit and a host active circuit that are electrically coupled by two conductors and optically coupled by a fiber optic cable. The active optical cable assemblies further comprise host and client connectors. According to various embodiments, the active optical cable assemblies, as well as associated methods, optical cable systems, and integrated circuits, described herein may prevent an untimely termination detect by controllably enabling host and client terminations within the host and client active circuits, respectively. By controllably enabling the host and client terminations of the active optical cable assembly, a universal serial bus 3.0 (USB 3.0) compliance mode may be avoided when the active optical cable assembly is connected to a host device prior to being connected to a client device (e.g., a host electronics device and a client electronics device). Although embodiments may be described within the context of the USB 3.0 standard, embodiments are not limited thereto. It is contemplated that embodiments may be implemented in future standards of USB, as well as other communication protocols and standards that detect a client termination impedance before initiating communication. Active optical cable assemblies, methods for initializing communication over an active optical cable, systems comprising an active optical cable, integrated circuits, and adapters for facilitating communication between a host device and a client device over a fiber optic cable will be described in further detail herein with specific reference to the appended figures.

Generally speaking, due to the high data rates of USB 3.0 (e.g., 4.8 Gb/s), the cable length of reasonably sized traditional passive electrical conductor cable assemblies is limited to about 3 meters or less due to skin and dielectric losses intrinsic to electrical conductors and dielectric materials. Further, conductor cables that are compatible with USB 3.0 are very bulky and put stress on the small connectors that are used on laptops and consumer devices such as camcorders. Because of these limitations, there may be interest in a fiber optic cable for use with USB 3.0. A fiber optic cable may be dramatically thinner, more flexible, easier to carry for portable use, and may put much less stress on the connectors used in small, handheld devices. Additionally, a fiber optic cable assembly may comprise cable lengths of 100 meter spans, allowing USB 3.0 to be used in markets such as video delivery and thin-client computing.

Traditionally, a host communicates digital data bi-directionally with a client over four copper conductors in a cable. The data is coded for direct current (DC) balance (i.e., a substantially constant average value) and sent through coupling capacitors and terminated by resistors at the client side. Use of a fiber optic cable in a USB 3.0 standard system presents two problems. First, the USB 3.0 specification powers-down the link and then sends very short keep-alive signals with a protocol called Low Frequency Periodic Signaling (LFPS) in order to conserve end device (i.e., client device) power. However, most optical transceivers require continuously running data streams to set their laser bias and photodiode slicing levels using long-time-constant feedback loops, which is something that USB 3.0 precludes.

Second, USB 3.0 detects the presence of a client by looking for the presence of a termination load change when the end of the cable is mated to the client circuitry. To detect the presence of a client device, the host device periodically pulses the output data line high. It then looks to see how long the voltage remains high. If there is no client device attached to the other end of the cable, then the data line will be a high-impedance open circuit and the voltage will float high for an extended period of time. However, if a client device is attached, the voltage will be rapidly pulled to a logic-zero level by termination resistors in the client device circuitry. Once the host device detects termination, it will start a handshake to identify and train the client circuitry prior to sending data.

USB 3.0 assumes a copper cable will be used to connect the host device to the client device. However, in a standard fiber optic link, there is not normally any DC communication between the two sides of the fiber optic like except for explicit data transferred. In a fiber optic cable, both the host side and client side of the cable will have some termination load associated therewith due to the laser diode drive circuitry and photodetector circuitry used to convert electrical signals into optical signals and optical signals into electrical signals. If such a fiber optic cable is only connected to the host end, leaving the client end unconnected, the host device will conclude that a valid client has been attached. It will then initiate a handshake attempt which will fail. USB 3.0 allows the user 360 milliseconds or less time between attaching one end of a fiber optic cable and completing the attachment at the other end. The USB 3.0 standard specifies that the host device enter a compliance mode which causes the system to put out a set of standard test patterns until the host device is reset. Because there is no way to exit the compliance mode other than power-cycling the system, a standard fiber optic link will lock up and fail. Accordingly, it is desired that the fiber optic cable link be configured to be connected to the host device or client device in any order without causing the system to enter compliance mode.

Briefly described, embodiments ensure that both the client device and the host device detect a termination only when the cable has been properly connected at both ends of the fiber optic link. Embodiments allow an active optical cable to signal from one end of an active fiber optic cable to another end to simulate the real-time impedance change that is measurable in an conductor-only cable, and further allow the active optical cable to be installed either end first with no constraints on time while avoiding any lock-up due to the USB 3.0 standard compliance mode circuitry.

Figure 1A:
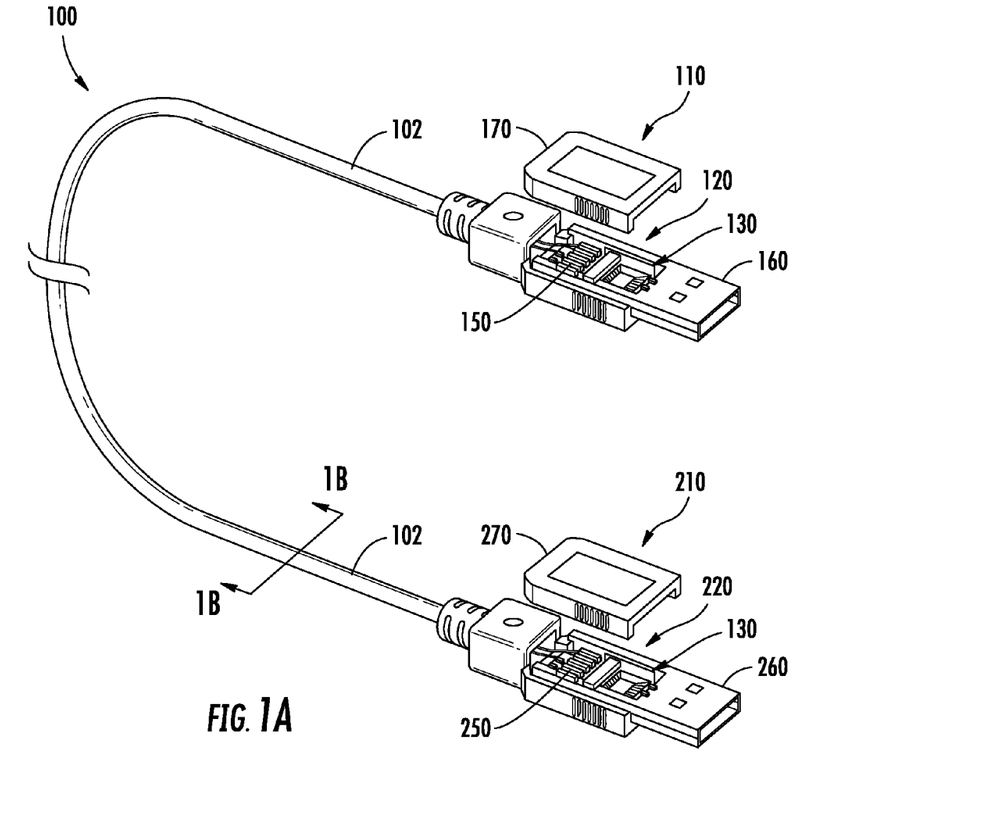
FIG. 1A graphically depicts a partial exploded perspective view of an active optical cable assembly according to one or more embodiments described and illustrated herein.

One embodiment of an active optical cable assembly 100 is illustrated in FIG. 1A. The active optical cable assembly 100 generally comprises a host connector 110, a fiber optic cable 102, and a client connector 210. Within a host housing 170 of the host connector 110 is a host active circuit 120. As described in more detail below, the host active circuit 120 is operable to convert electrical and optical signals to provide communication between a host device and a client device over the active optical cable using the USB 3.0 standard. In the illustrated embodiment, the host active circuit 120 generally comprises a host transceiver circuit 150 that converts the electrical and optical signals, and a host active integrated circuit 130 operable to, among other things, selectively enable a host termination impedance upon certain conditions (e.g., see host termination impedance 133 of FIG. 3). A first end 160 of the host connector 110 is configured to be coupled to a corresponding host port of a host device according to the USB standard. The terms port and connector are used interchangeably herein. It should be understood that the host connector 110 may possess a different configuration when the active optical cable is implemented in a system that uses a communication protocol other than USB (e.g., Firewire). It should also be understood that no limitations are intended by the depiction of male and female connector configurations provided in the figures.

FIG. 1A illustrates the host active circuit 120 as comprising a host transceiver circuit 150 and a separate host active integrated circuit 130. However, it is contemplated that the components of both the host transceiver circuit 150 and the host active integrated circuit 130 may be provided in a single integrated circuit according to some embodiments. Additionally, the host active integrated circuit 130 may not be configured as an integrated circuit but rather as a plurality of discrete components.

A client connector 210 is located at the opposite end of the fiber optic cable 102 from the host connector 110. Within a client housing 270 of the client connector 210 is a client active circuit 220. Like the host active circuit 120 described above, the client active circuit 220 is operable to convert electrical and optical signals to provide communication between the host device and the client device. In the illustrated embodiment, the client active circuit 220 generally comprises a client transceiver circuit 250 that also converts the electrical and optical signals, and a client active integrated circuit 230 operable to, among other things, selectively enable a client termination impedance upon certain conditions (e.g., see client termination impedance 233 of FIG. 3). Both the host transceiver circuit 150 and the client transceiver circuit 250 may comprise fixed-bias lasers and detectors capable of optically communicating the low-duty cycle LFPS protocol of USB 3.0. A first end 260 of the client connector 210 is configured to be coupled to a corresponding client port of a client device according to the USB standard. As described above with respect to the host connector, the client connector 210 may possess a different configuration when the active optical cable is implemented in a system that uses a communication protocol other than USB. Embodiments of the present disclosure may also be configured such that the client transceiver circuit 250 and the client active integrated circuit are implemented in a single integrated circuit, or comprise a plurality of discrete components.

Figure 6:
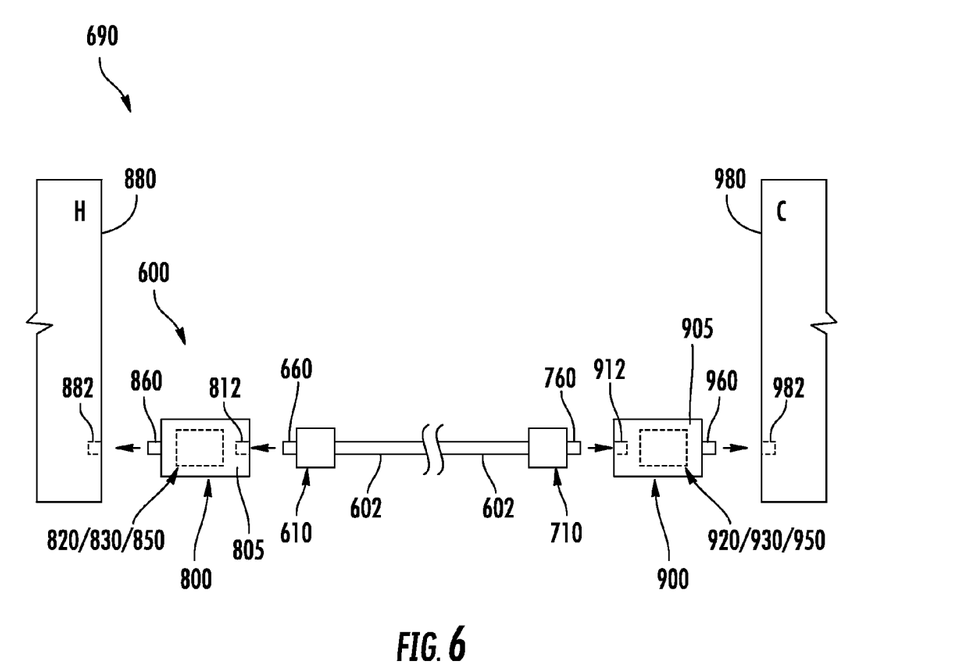
FIG. 6 schematically depicts an active optical cable assembly comprising a fiber optic cable assembly, a host adapter module, and a client adapter module according to one or more embodiments described and illustrated herein.

It is noted that embodiments are not limited to the packaging configuration illustrated in FIG. 1A. For example, the host active circuit 120 and the client active circuit 220 need not be located within the host connector 110 and the client connector 210, respectively. For example, the host active circuit 120 and the client active circuit 220 may be provided in one or more adapter modules used to adapt a fiber optic cable to USB environments. Use of adapters may be particularly advantageous in applications wherein the host device or the client device uses micro or mini USB connectors that provide for very small connector housings. One embodiment of an active optical cable assembly 600 utilizing adaptor modules 800/900 is illustrated in FIG. 6 and described in detail below. It is also contemplated that the host active circuit 120 and the client active circuit 220 may be located within the active optical cable 100 at locations other than within the host connector 110 and client connector 210, respectively. For example, the host active circuit 120 may be maintained within a housing that is located just prior to the host connector 110 along the fiber optic cable 102, and the client active circuit 220 may be maintained within a housing that is located just prior to the client connector 210 along the fiber optic cable 102. Any number of configurations may be utilized.

Figure 1B:
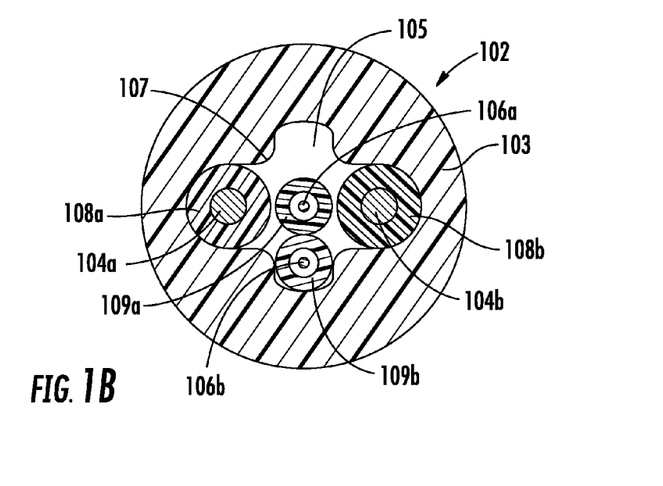
FIG. 1B schematically depicts a cross-sectional view of the fiber optical cable of the active optical cable assembly depicted in FIG. 1A according to one or more embodiments described and illustrated herein.

Referring now to FIG. 1B, one non-limiting example of the fiber optic cable 102 is illustrated schematically in cross section. It should be understood that other fiber optic cable configurations may be utilized. The fiber optic cable 102 includes a polymer jacket 103 having an outer periphery and an inner periphery with the inner periphery defining a channel 105. The channel 105 is the same as an optical fiber envelope. The polymer jacket 103 may surround the channel 105 and the channel 105 may extend the entire length of the fiber optic cable 102. The fiber optic cable 102 further comprises a plurality of conductors 104a, 104b (e.g., electrically conductive wires) that may supply power to peripheral devices. The two conductors 104a, 104b are capable of electrically coupling the host active circuit to the client active circuit. For example, the two conductors 104a, 104b may receive and provide a voltage VBUS and a ground reference potential GND. The two conductors 104a, 104b may be made of a conductive material, such as copper. It should be understood that additional conductors may be utilized to transmit additional electrical signals through the fiber optic cable 102. In one embodiment, no conductors may be present within the fiber optic cable. For example, no conductors may be present in embodiments wherein the client active circuit receives power from the client device rather from the host device via the host active circuit 120. The conductors 104a, 104b may be surrounded by an insulating material 108a, 108b, respectively. It is not a requirement that the conductors 104a, 104b surrounded by an insulating material 108a, 108b.

Data-carrying buffered optical fibers 106a, 106b are also included within the fiber optic cable 102. Optical fiber 106a may be configured to propagate optical signals in a first direction, and optical fiber 106b may be configured to propagate optical signals in a second direction. In another embodiment, the optical fiber 106a may comprise a plurality of optical fibers, and optical fiber 106b may also comprise a plurality of optical fibers configured to propagate optical signals in a first direction and second direction, respectively. In yet another embodiment, a single optical fiber (or a plurality of optical fibers) may be included in the fiber optic cable 102. The single optical fiber may be configured to propagate optical signals bi-directionally (e.g., by operation of a switch, a multiplexer and/or a beam splitter).

The optical fibers 106a, 106b depicted in FIG. 1B are also each surrounded by a jacket 109a, 109b. The conductors 104a, 104b and the optical fibers 106a, 106b are positioned within the channel 105. In some embodiments, the conductors 104a, 104b may be arranged within the polymer jacket 103. The optical fibers 106a, 106b are free to translate within the channel 105 when the fiber optic cable 102 is bent.

The shape of the channel 105, or optical fiber envelope 105, is established so that no matter how the fiber optic cable 102 is bent, the optical fibers 106a, 106b will never be bent below their minimum bend radius. The channel 105 as illustrated is "cross" shaped. However, there is no requirement that the channel 105 be cross shaped and may be any shape necessary to accommodate optical fiber translation so when the fiber optic cable 102 is bent, optical fibers 106a, 106b are not bent to a radius below the minimum bend radius. The channel 105 shape and orientation may also depend on the preferred of bending and locations of other elements within the fiber optic cable 105.

In some embodiments, the fiber optic cable 102 further includes a strength material, such as an aramid yarn or Kevlar. The strength material may be arranged within the channel 105. It is not required that the strength material be arranged as such, or even required, and may be arranged within the jacket 103 or the channel 105 in any convenient orientation or arrangement. The strength material may surround the optical fibers 106a, 106b and conductors 104a, 104b. The strength material may be positioned in a space between the conductors 104a, 104b, the optical fibers 106a, 106b and the jacket 103. The strength material allows the optical fibers 106a, 106b to move to a limited extent within the jacket 103. It should be understood that other arrangements of the components illustrated in FIG. 1B are within the scope of this disclosure.

In one embodiment, the fiber optic cable 102 is capable of being bent while successfully propagating optical signals. For example, the optical fibers may have a minimum bend radius of approximately 1.2 mm or greater. The minimum bend radius is the smallest radius the optical fibers 106 within the fiber optic cable 102 may be bent before excessive attenuation of the optical signals of the optical fibers 106 occurs. In one embodiment, the predetermined acceptable attenuation range is about 1.5 dB to 2.0 dB, and the minimum bend radius is about 1.2 mm or greater. It should be understood that fiber optic cables having other properties may be used.

Figure 2:
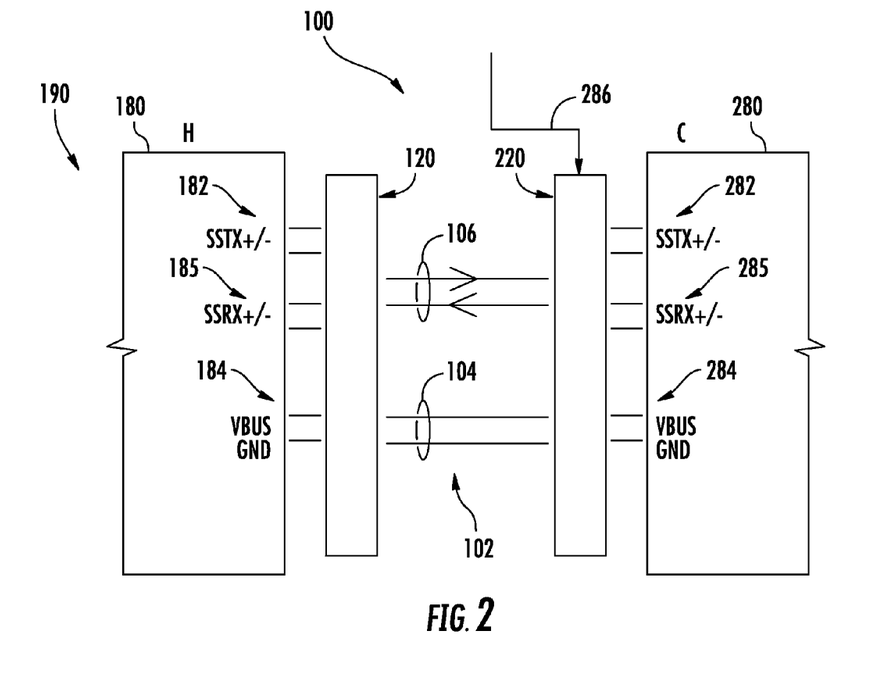
FIG. 2 schematically depicts a system having an active optical cable assembly according to one or more embodiments described and illustrated herein.

FIG. 2 schematically depicts a system 190 generally comprising a host device 180 (e.g., a computer), an active optical cable assembly 100, and a client device 280 (e.g., a camera). The host device 180 is communicatively coupled to the client device 280 via the active optical cable assembly 100. The host device 180 and the client device 280 may communicate by using the USB 3.0 standard over the active optical cable assembly 100. As shown in FIG. 2, the host active circuit 120 acts as a host interface and the client active circuit 220 acts as a client interface for communication over the active optical cable assembly 100.

The host device comprises a host output 182 and a host input 185 that are electrically coupled to the host active circuit 120 when the host connector 110 is connected to an associated host input connector on the host device. The host active circuit 120 receives the voltage VBUS and the ground reference potential GND from the host device 180 via the host connector 110. Transmitted host electrical signals are outputted from the host device 180 at the host output 182, and received client electrical signals are received at the host input 185. As described in more detail below, the host active circuit 120 converts the transmitted host electrical signals into host optical signals for propagation over the optical fibers 106 of the fiber optic cable 102. Additionally, the host active circuit 120 converts received client optical signals into the received client electrical signals.

The client device comprises a client output 282 and a client input 285 that are electrically coupled to the client active circuit 220 when the client connector 210 is connected to an associated client input connector on the client device. The client active circuit 220 receives the voltage VBUS and the ground reference potential GND from the host active circuit 120 via the two conductors 104. Transmitted client electrical signals are outputted from the client device 280 at the client output 282, and received host electrical signals are received at the client input 285. The client active circuit 220 converts the transmitted client electrical signals into client optical signals for propagation over the optical fibers 106 of the fiber optic cable 102. Additionally, the client active circuit 220 converts received host optical signals into the received host electrical signals. In this manner, the host device 180 and the client device 280 may communicate via USB 3.0 over the active optical cable assembly.

Figure 3:
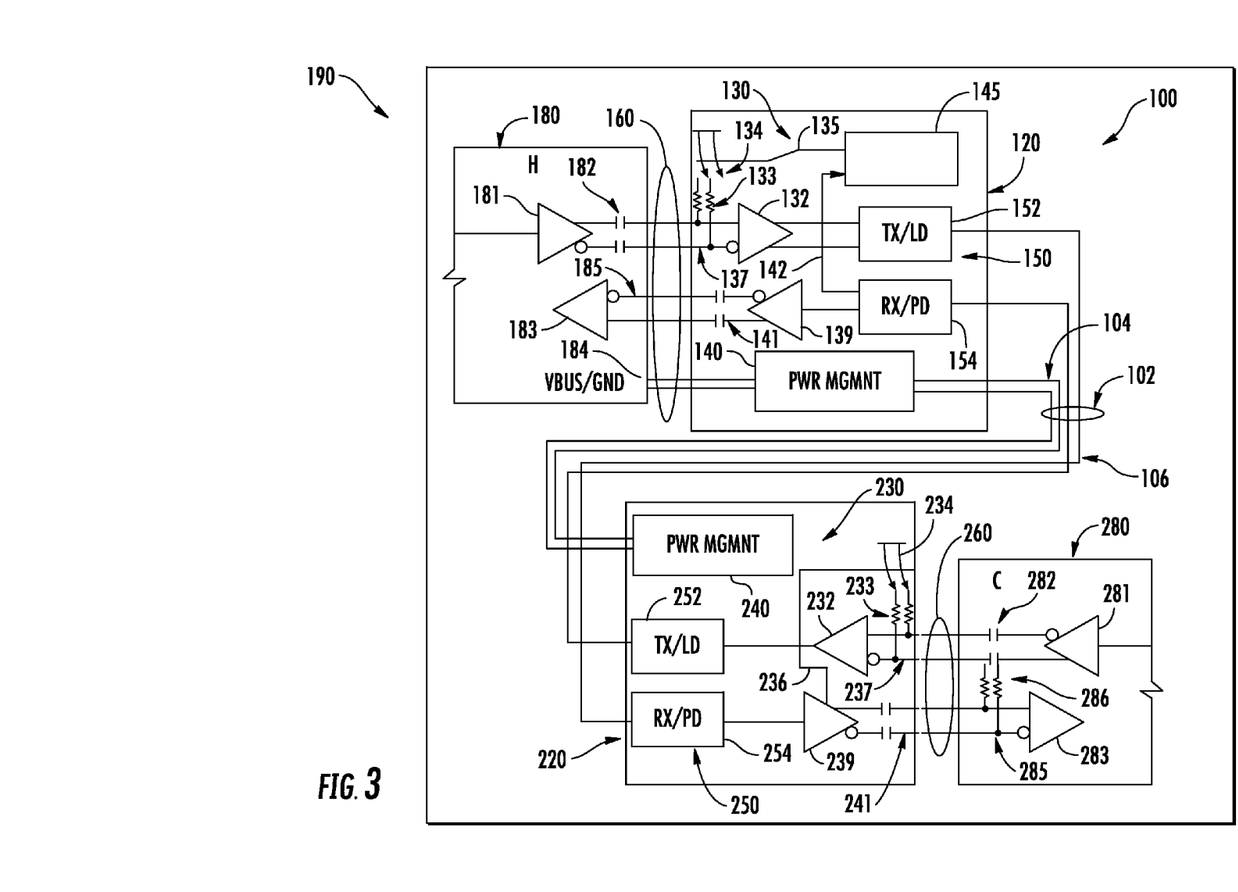
FIG. 3 schematically depicts a system having an active optical cable assembly comprising a host active circuit and client active circuit that detect client termination through optical power detection according to one or more embodiments described and illustrated herein.

Referring now to FIG. 3, one embodiment of an active optical cable assembly 100 implemented in a system 190 is illustrated in detail. Generally, the embodiment illustrated in FIG. 3 uses optical pulses generated by the client device and client active circuit 220 to detect the presence of a client device 280 at the client active circuit 220 prior to terminating the host active circuit 120. Only when the host active circuit 120 detects optical pulses generated by the client active circuit 220 will the host termination impedance 133 be enabled.

Starting from the host-side, the host device 180 comprises a host output 182 that is coupled to a host output driver 181. The host output driver 181 comprises a high-speed transmitter device as defined in the USB 3.0 specification. The host output driver 181 passes the transmitted host electrical signals to the host active circuit 120 through conductive pins of the first end 160 of the host connector 110. The host input 185 is coupled to a host input driver 183 that comprises a high-speed buffer device as defined in the USB 3.0 specification.

The host active circuit 120 illustrated in FIG. 3 generally comprises host transceiver circuit 150, host input line 137, host termination switch 134, host termination impedance 133, host interface input module 132, pulse stretcher circuit 145, host output line 141, host interface output module 139, and host power management module 140. In one embodiment, each of the components except for the host transceiver circuit 150 is configured as a single integrated circuit. In another embodiment, all of the components of the host active circuit 120 are configured as a single integrated circuit. In yet another embodiment, all of the components of the host active circuit 120 are discrete components.

Generally, the host transceiver circuit 150 comprises a host laser diode circuit 152 that includes laser diode drive circuitry and a laser diode optically coupled to the optical fibers 106. The host laser diode circuit 152 is operable to receive transmitted host electrical signals from the host device 180 and the host interface input module 132 such that an output of the laser diode is modulated by the transmitted host electrical signals. The host transceiver circuit 150 further comprises a host photodiode circuit 154 that comprises a photodiode and related circuitry that are operable to receive client optical signals and convert the same into received client electrical signals.

Rather than directly coupling the host transceiver circuit 150 to the host output 182 and the host input 185, the host output 182 and the host input 185 are coupled to the host interface input module 132 and the host interface output module 139 via the host input line 137 and the host output line 141, respectively. The host interface input module 132 and host interface output module 139 may be configured as high-speed buffer devices as defined by USB 3.0 specification. The host termination impedance 133 is electrically coupled to the host input line 137 and the host interface input module 132. The host termination impedance 133 of the illustrated embodiment is depicted as two resistors, with each resistor coupled to an input of the host interface input module 132. The other end of the host termination impedance 133 is normally floating, and is connected to the ground reference potential GND via host termination switch 134 only when the host active circuit 120 detects that a client device has been connected to the client active circuit 220. As depicted in FIG. 3, the host termination switch 134 is illustrated as two switches that are coupled to the ground reference potential GND with their contacts being coupled to the resistors of the host termination impedance 133 when in the closed state. The host termination switch 134 may be configured as a bipolar transistor, a MOSFET, or other similar electronic switching devices.

The host power management module 140 is operable to receive the voltage VBUS and ground reference potential GND from the host device at power connection 184 via a power input. The host power management module 140 is also operable to provide the voltage VBUS and the ground reference potential GND to the two conductors 104 at a power output such that the client active circuit 220 also receives the voltage VBUS and the ground reference potential GND.

The pulse stretcher circuit 145, as described in more detail below, is a switch driver device that receives an output 142 of the host photodiode circuit 154 when the host photodiode circuit 154 receives client optical signals from the optical fibers 106. The received optical signals are generally pulses of light that the host photodiode circuit 154 converts into electrical pulses. The pulse stretcher circuit 145 receives the electrical pulses and stretches each pulse to produce a continuous signal consisting over overlapping, stretched electrical pulses. The output 135 of the pulse stretcher circuit 145 is provided to the host termination switch 134. In one embodiment, the pulse stretcher circuit 145 is configured as a monostable circuit, such as may be provided by an industry standard LM555 timer integrated circuit.

Referring now to the client-side, the client device 280 comprises a client output 282 that is coupled to a client output driver 281. The client output driver 281 may comprise a high-speed transmitter device as defined in the USB 3.0 specification. The client output driver 281 passes the transmitted host electrical signals to the client active circuit 220 through conductive pins of the first end 260 of the client connector 210. The client input 285 is coupled to a client input driver 283 that may comprise a high-speed buffer device as defined in the USB 3.0 specification.

The client active circuit 220 shares some similarity with the host active circuit 120. The client active circuit 220 illustrated in FIG. 3 generally comprises client transceiver circuit 250, client input line 237, client termination switch 234, client termination impedance 233, client interface input module 232, client output line 241, client interface output module 239, and client power management module 240. In one embodiment, each of the components except for the client transceiver circuit 250 is configured as a single integrated circuit. In another embodiment, all of the components of the client active circuit 220 are configured as a single integrated circuit. In yet another embodiment, all of the components of the client active circuit 220 are discrete components. In yet another embodiment, the client active circuit 220 shares all of the same components of the host active circuit 120 such that the two circuits are identical to each other. For example, a single integrated circuit design may be used for both the host active circuit and the client active circuit, and the functionality of the integrated circuit would depend whether the integrated circuit is coupled to a host device or a client device.

Similar to the host transceiver circuit 150 described above, the client transceiver circuit 250 comprises a client laser diode circuit 252 that includes a laser diode drive circuitry and a laser diode optically coupled to the optical fibers 106. The client laser diode circuit is operable to receive transmitted client electrical signals from the client device 280 and the client interface input module 232 such that an output of the laser diode is modulated by the transmitted client electrical signals. The client transceiver circuit 250 further comprises a client photodiode circuit 254 that comprises a photodiode and related circuitry that are operable to receive host optical signals and convert the same into received host electrical signals.

Rather than directly coupling the client transceiver circuit 250 to the client output 282 and the client input 285, the client output 282 and the client input 285 are coupled to the client interface input module 232 and the client interface output module 239 via the client input line 237 and the client output line 241, respectively. The client interface input module 232 and the client interface output module 239 may be configured as high-speed buffer devices as defined by USB 3.0 specification. The client termination impedance 233 is electrically coupled to the client input line 237 and the client interface input module 232. The client termination impedance 233 of the illustrated embodiment is depicted as two resistors, with each resistor coupled to an input of the client interface input module 232. The other end of the client termination impedance 233 is normally floating, and is connected to the ground reference potential GND via client termination switch 234. As depicted in FIG. 3, the client termination switch 234 is illustrated as two switches that are coupled to the ground reference potential GND with their contacts being coupled to the resistors of the client termination impedance 233 when in the closed state. The client termination switch 234 may be configured as a bipolar transistor, a MOSFET, or other similar electronic switching devices.

The client power management module 240 is operable to receive the voltage VBUS and ground reference potential GND from the host active circuit 120. In an alternative embodiment, the client power management module 240 receives a voltage and a ground reference potential from an external source, or from the client device 280.

As described above, embodiments of the present disclosure enable a host device and a client device to communicate with one another over a fiber optic cable without the host device and/or the client device locking up due to a faulty termination detection. Embodiments described herein selectively enable the termination impedances of active optical cable assembly 100 such that the host device 180 properly detects the connection of the client device 280 on the opposite end of the active optical cable assembly 100, and the client device 280 properly detects the connection of the host device 180 on the opposite end of the active optical cable assembly 100.

Methods of detecting client and host terminations according to the active optical cable assembly 100 illustrated in FIG. 3 will now be described. When the active optical cable assembly 100 is not connected to a host device 180 or a client device 280, the host termination switch 134 and the client termination switch 234 are normally open.

When a client device 280 is connected to the client active circuit 220 but no host device 180 is connected to the host active circuit 120, the host termination switch 134 and the client termination switch 234 will remain open because 1) the host active circuit 120 has not received power, and 2) the client active circuit 220 has not received power because it depends on the host active circuit 120 for the voltage VBUS and ground reference potential GND.

When a host device 180 is connected to the host active circuit 120 but there is no client device 280 connected to the client active circuit 220 (a condition that would normally cause the host device 180 to lock up if using a traditional fiber optic cable), the voltage VBUS and ground reference potential GND are provided to the host power management module 140 from the host device 180, and provided to the client power management module 240 via the two conductors 104. Because the host active circuit 120 has not detected the presence of a client device 280 at the client active circuit 220, the host termination switch 134 remains open such that the host termination impedance 133 is not enabled. Therefore, the host device 180 sees a high-impedance, open circuit at the host active circuit 120 and determines that there is no client device 280 present on the link.

In one embodiment, the client power management module 240 is electrically coupled to the client termination switch 234 and will close the client termination switch 234 upon receipt of the voltage VBUS and ground reference potential GND from the two conductors 104. In this manner, the client active circuit 220 detects the presence of a host device 180 coupled to the host active circuit 120 by receipt of the voltage VBUS and ground reference potential GND. In an alternative embodiment, as depicted in FIG. 3, the client interface output module 239 is operable to detect a client input termination impedance 286 associated with the client device 280, and output a termination detect signal to the client termination switch 234 on the termination detection line 236 upon a detection of the client input termination impedance 286. In this embodiment, the client termination switch 234 only closes when a client device 280 is connected to the client active circuit 220 (which is detected by the client interface module 239) and the client active circuit receives the voltage VBUS and ground reference potential GND from the host active circuit 120.

When a host device 180 and a client device 280 are connected to the active optical cable assembly 100, the client termination switch 234 may activate as described above. Upon enablement of the client termination impedance 233 via the client termination switch 234, the client device 280 detects the client termination impedance 233 and begins to transmit client electrical signals on client input line 237. The client interface input module 232 passes the transmitted client electrical signals to the client laser diode circuit 252, which converts the transmitted client electrical signals into client optical signals that are propagated through the optical fibers 106. The host photodiode circuit 154 receives the client optical signal and converts it into a received client electrical signal comprising a plurality of electrical pulses. The plurality of electrical pulses are provided to the pulse stretcher circuit 145 that stretches the plurality of electrical pulses into a continuous signal that is passed to the host termination switch 134. The continuous signal then activates the host termination switch 134 to enable the host termination impedance 133. The host device 180 detects the presence of the host termination impedance 133 and determines that a client device is present. The host device 180 then starts communication.

In this manner, the host termination impedance 133 is enabled when a client device 280 is coupled to the client active circuit 220, and the client termination impedance 233 is enabled when a host device 180 is coupled to the host active circuit 120. In the embodiment illustrated in FIG. 3, the host active circuit 120 detects the presence of a client device 280 by receipt of optical power from the client active circuit 220 and the client device 280.

Figure 4:
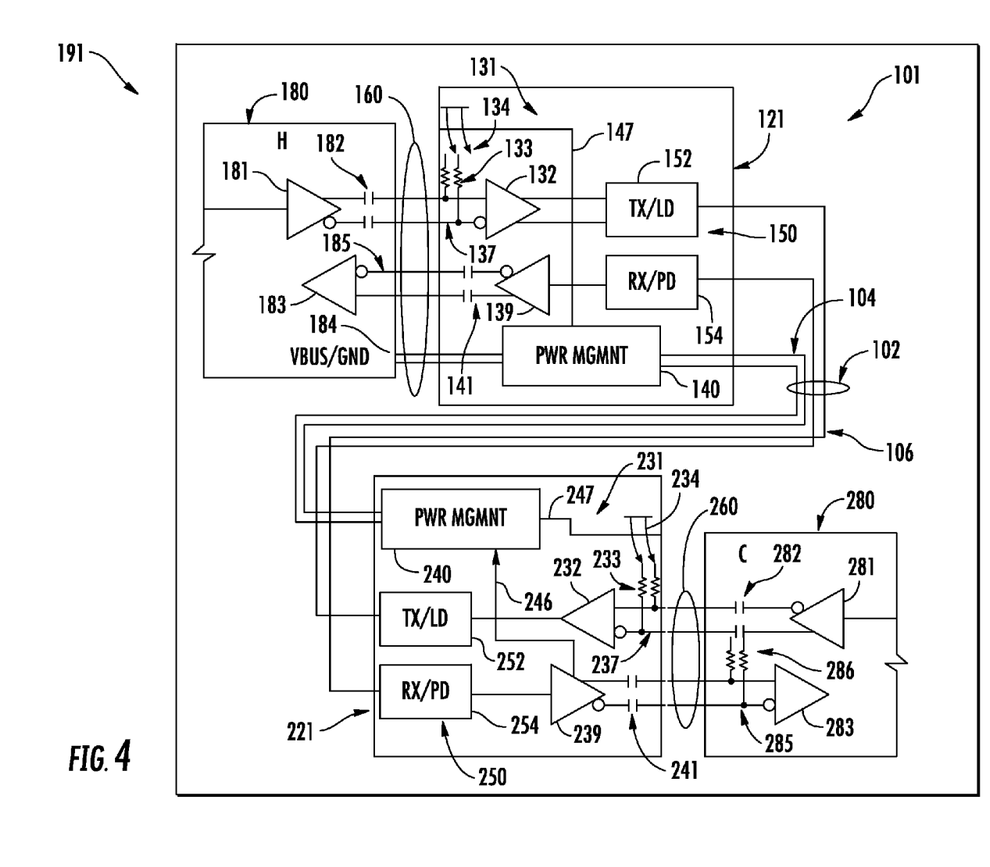
FIG. 4 schematically depicts a system having an active optical cable assembly comprising a host active circuit and client active circuit that detect client termination through client active circuit power draw according to one or more embodiments described and illustrated herein.

Referring now to FIG. 4, another embodiment of an active optical cable assembly 101 implemented in a system 191 is illustrated in detail. Generally, the embodiment illustrated in FIG. 4 uses a power draw generated by the client device 280 and client active circuit 221 to detect the presence of a client device 280 at the client active circuit 220 prior to terminating the host active circuit 121. As described in more detail below, the client active circuit 221 will draw more power from the host active circuit 121 when a client device 280 is connected to the client active circuit 221.

Referring first to the host-side, the host active circuit 121 illustrated in FIG. 4 is similar to the embodiment illustrated in FIG. 3. The host active circuit 121 of the present embodiment does not include a pulse stretcher circuit 145. Rather, the host power management module 140 has an output line 147 that is provided to the host termination switch 134. The host power management module 140 is configured to sense power drawn on the two conductors 104 by the client active circuit 221 and to provide a host switch signal when the client active circuit power draw level is above a power draw threshold. The remaining components are similar to the host active circuit 120 described with respect to the embodiment illustrated in FIG. 3.

Referring now to the client-side, the client active circuit 221 illustrated in FIG. 4 is similar to the embodiment illustrated in FIG. 3. In the present embodiment, the termination detect line 246 is coupled to the client interface output module 239 and to the client power management module 240. The client power management module 240 is operable to provide a client switch signal to the client termination switch 234 on line 247 upon receipt of the voltage VBUS and ground reference potential GND from the host active circuit 121 and, according to one embodiment, a termination detect signal from the client interface output module 239 when the client interface output module 239 detects the presence of a client device 280.

Similar to the optical power embodiment illustrated in FIG. 3, when the active optical cable assembly 101 is not connected to a host device 180 or a client device 280, the host termination switch 134 and the client termination switch 234 are normally open.

When a client device 280 is connected to the client active circuit 221 but no host device 180 is connected to the host active circuit 121, the host termination switch 134 and the client termination switch 234 will remain open because 1) the host active circuit 121 has not received power, and 2) the client active circuit 221 has not received power because it depends on the host active circuit 121 for the voltage VBUS and ground reference potential GND.

When a host device 180 is connected to the host active circuit 121 but there is no client device 280 connected to the client active circuit 221 (a condition that would normally cause the host device 180 to lock up if using a traditional fiber optic cable), the voltage VBUS and ground reference potential GND are provided to the host power management module 140 from the host device 180, and provided to the client power management module 240 via the two conductors 104. Because the host active circuit 121 has not detected the presence of a client device 280 at the client active circuit 220, the host termination switch 134 remains open such that the host termination impedance 133 is not enabled. Therefore, the host device 180 sees a high-impedance, open circuit at the host active circuit 121 and determines that there is no client device 280 present on the link.

In one embodiment, the client power management module 240 provides a client switch signal to activate the client termination switch 234 upon receipt of the voltage VBUS and ground reference potential GND from the host active circuit 121. In another embodiment, as depicted in FIG. 4, the client interface output module 239 is operable to detect a client input termination impedance 286 associated with the client device 280, and output a termination detect signal to the client power management module 240 on the termination detection line 246 upon a detection of the client input termination impedance 286. The client power management module 240 will then provide the client switch signal to the client termination switch 234. In this embodiment, the client termination switch 234 only closes when a client device 280 is connected to the client active circuit 221 (which is detected by the client interface output module 239) and the client active circuit receives the voltage VBUS and ground reference potential GND from the host active circuit 120.

When a host device 180 and a client device 280 are connected to the active optical cable assembly 101, the client termination switch 234 may activate as described above. Upon enablement of the client termination impedance 233 via the client termination switch 234, the client device 280 detects the client termination impedance 233 and begins to transmit client electrical signals on client input line 237. The client interface input module 232 passes the transmitted client electrical signals to the client laser diode circuit 252, which converts the transmitted client electrical signals into client optical signals that are propagated through the optical fibers 106. The generation of optical signals by the client laser diode circuit 252 increases the level of current drawn by the client active circuit 221 on the two conductors 104. The level of current will therefore increase when there is a client device 280 coupled to the client active circuit 221. This power draw information is used by the host active circuit 121 to verify that a client device 280 is present on the link. As described above, the host power management module 140 is operable to sense the power drawn on the two conductors 104. Power drawn that is above a threshold value is indicative that a client device 280 is connected to the client active circuit 221 because of the operation of the client laser diode circuit 252. Accordingly, the host power management module 140 provides a host switch signal to the host termination switch 134 when the power drawn by the client active circuit 221 is above the power draw threshold value, thereby enabling the host termination impedance 133. The host device 180 detects the presence of the host termination impedance 133, determines that a client device is present, and starts communication.

In this manner, the host termination impedance 133 is enabled when a client device 280 is coupled to the client active circuit 221, and the client termination impedance 233 is enabled when a host device 180 is coupled to the host active circuit 121. In the embodiment illustrated in FIG. 4, the host active circuit 121 detects the presence of a client device 280 by sensing power drawn by the client active circuit 220.

Figure 5:
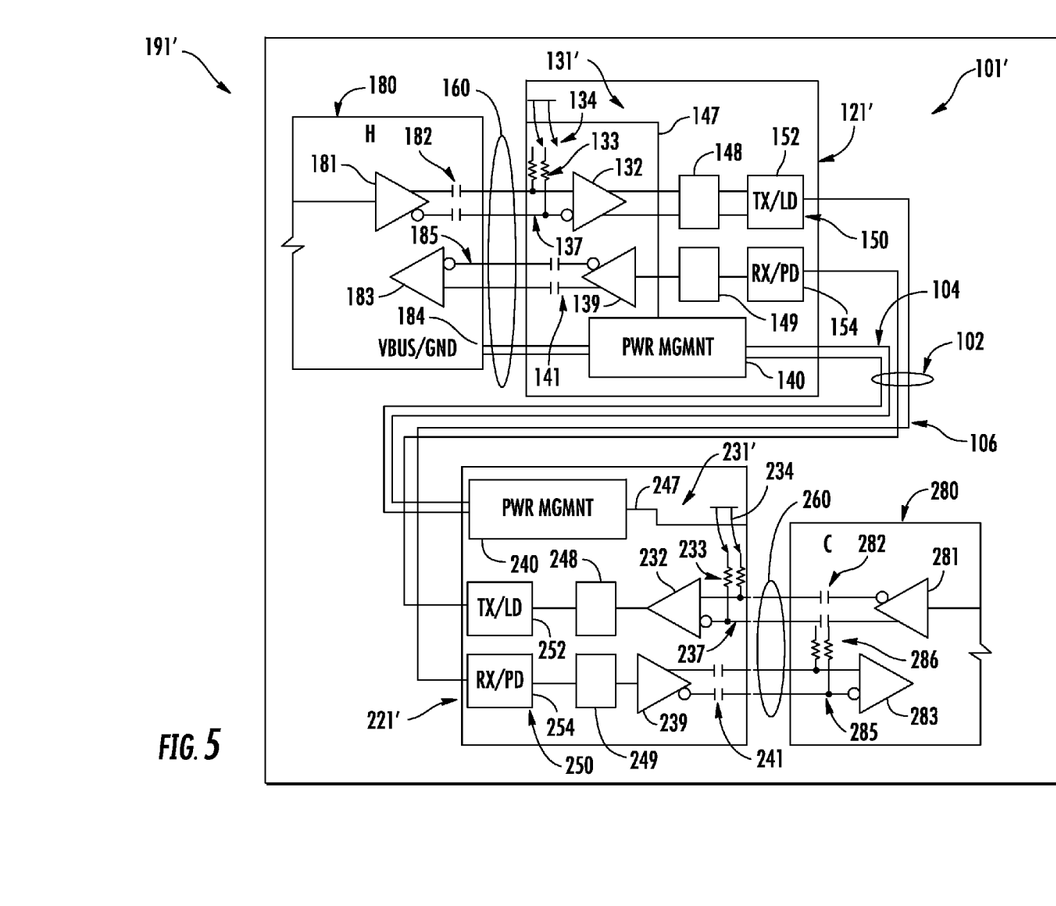
FIG. 5 schematically depicts a system having an active optical cable assembly comprising a host active circuit and client active circuit that detect client termination through the use of one or more client status bits according to one or more embodiments described and illustrated herein.

Referring now to FIG. 5, another embodiment of an active optical cable assembly 101' implemented in a system 191' is illustrated in detail. Generally, the embodiment illustrated in FIG. 5 uses a client status bit and, in some embodiments, a host status bit inserted into a data stream that is decoded to ascertain the present of a client device and/or a host device on the link provided by the active optical cable assembly 101'.

Referring first to the host-side, the host active circuit 121' illustrated in FIG. 5 is similar to the embodiment illustrated in FIG. 4. However, FIG. 5 illustrates a host active circuit 121' having a host coder module 148 electrically coupled to the host interface input module 132 and the host laser diode circuit 152, and a host decoder module 149 electrically coupled to the host interface output module 139 and the host photodiode circuit 154. The host coder module 148 and host decoder module 149 are in electrical communication with the host power management module 140.

The host coder module 148 and host decoder module 149 may be implemented via a MUX/DEMUX circuit. It is noted that the MUX/DEMUX circuit may be implemented in the embodiment illustrated in FIGS. 3 and 4 to perform line-coding functions according to USB 3.0 to properly modulate the laser diode assemblies. In the embodiment illustrated in FIG. 5, the host coder module 148 and the host decoder module 149 are utilized for client detection purposes in addition to traditional line-coding functions and are therefore only illustrated in FIG. 5. The same is true for the client coder module 248 and client decoder module 249 described below.

The host coder module 148 is operable to receive a host data stream from the host device 180 and break the host data stream into a plurality of host data packets. The host decoder module 149 is operable to receive a plurality of client data packets from the client active circuit 221' and reassemble the plurality of client data packets into a client data stream.

Referring now to the client-side, the client active circuit 221' illustrated in FIG. 5 is similar to the embodiment illustrated in FIG. 4. In the present embodiment, a termination detect line is not provided from the client interface output module 239 to the client power management module 240 (although it may be provided in some embodiments). Similar to the host-side, the client active circuit 221' comprises a client coder module 248 electrically coupled to the client laser diode circuit 252 and the client interface input module 232, and a client decoder module 249 electrically coupled to the client photodiode circuit 254 and the client interface output module 239. The client coder module 248 and client decoder module 249 are in electrical communication with the client power management module 240. The client coder module 248 and client decoder module 249 may be implemented via a MUX/DEMUX circuit, as described above with respect to the host active circuit 121'

The client coder module 248 is operable to receive a client data stream from the client device 280, and break the client data stream into a plurality of client data packets. The client decoder module 249 is operable to receive a plurality of host data packets from the host active circuit 121' and reassemble the plurality of host data packets into a host data stream.

The client power management module 240 is operable to provide a client switch signal to the client termination switch 234 on line 247 upon receipt of the voltage VBUS and ground reference potential GND from the host active circuit 121 and a termination detect signal from the client interface output module 239 when the client interface output module 239 detects the presence of a client device 280.

Methods of detecting client and host terminations according to some embodiments of the active optical cable assembly 101' illustrated in FIG. 5 will now be described. When the active optical cable assembly 101' is not connected to a host device 180 or a client device 280, the host termination switch 134 and the client termination switch 234 are normally open. As described below, the host termination switch 134 only closes upon receipt of a client status bit in the client data packets sent by the client active circuit 221'.

When a client device 280 is connected to the client active circuit 221' but no host device 180 is connected to the host active circuit 121', the host termination switch 134 and the client termination switch 234 will remain open because 1) the host active circuit 121' has not received power, and 2) the client active circuit 221' has not received power because it depends on the host active circuit 121 for the voltage VBUS and ground reference potential GND.

When a host device 180 is connected to the host active circuit 121' but there is no client device 280 connected to the client active circuit 221' (a condition that would normally cause the host device 180 to lock up if using a traditional fiber optic cable), the voltage VBUS and ground reference potential GND are provided to the host power management module 140 from the host device 180, and provided to the client power management module 240 via the two conductors 104. Because the host active circuit 121' has not detected the presence of a client device 280 at the client active circuit 221', the host termination switch 134 remains open such that the host termination impedance 133 is not enabled. Therefore, the host device 180 sees a high-impedance, open circuit at the host active circuit 121' and determines that there is no client device 280 present on the link.

In one embodiment, the client power management module 240 provides a client switch signal to activate the client termination switch 234 upon receipt of the voltage VBUS and ground reference potential GND from the host active circuit 121' independent of any client termination detection. In another embodiment, as depicted in FIG. 5, the host coder module 148, upon receipt of power from the host device 180, breaks the host data stream into the plurality of host data packets. The host coder module 148 then may insert a host status bit (or bits) into one or more of the plurality of host data packets. The host status bit is indicative of there being a valid host device 180 coupled to the host active circuit 121'. The plurality of host data packets (including the one or more host status bits) are optically transmitted over the optical fibers 106 and received by the client transceiver circuit 250 and converted into electrical signals that represent the host data packets. The client decoder module 249 receives the plurality of host data packets and retrieves the host status bit, if present, from one or more of the host data packets. If the host status bit indicates the presence of a valid host device 180 connected to the host active circuit 121', the client power management module 240 provides a client switch signal to the client termination switch 234 via line 247.

When a host device 180 and a client device 280 are connected to the active optical cable assembly 101', the client termination switch 234 may activate as described above.

Upon enablement of the client termination impedance 233 via the client termination switch 234, the client device 280 detects the client termination impedance 233 and begins to transmit a client data stream in the form of client electrical signals on client input line 237. The client coder module 248 receives the client data stream from the client interface input module 232 and breaks it into the plurality of client data packets. The client coder module 248 may then insert a client status bit (or bits) into one or more of the client data packets. The client status bit is indicative of a valid client device 280 coupled to the client active circuit 221'. The plurality of client data packets (including the one or more client status bits) are optically transmitted over the optical fibers 106 and received by the host transceiver circuit 150 and converted into electrical signals that represent the client data packets. The host decoder module 149 receives the plurality of client data packets and retrieves the client status bit, if present, from one or more of the client data packets. If the client status bit indicates the presence of a valid client device 280 connected to the client active circuit 221', the host power management module 140 provides a client switch signal to the host termination switch 134 via line 147.

In this manner, the host termination impedance 133 is enabled when a client device 280 is coupled to the client active circuit 221', and the client termination impedance 233 is enabled when a host device 180 is coupled to the host active circuit 121'. In the embodiment illustrated in FIG. 5, the host active circuit 121 detects the presence of a client device 280 by receipt of the client status bit from the client active circuit 221', and the host termination switch 134 is activated upon receipt of the voltage VBUS and ground reference potential GND and receipt of the client status bit. In one embodiment, the client termination switch 234 is activated upon receipt of the voltage VBUS and ground reference potential GND from the host active circuit 121'. In another embodiment, the client termination switch 234 is activated upon receipt of the voltage VBUS, the ground reference potential GND, and a host status bit from the host active circuit 121'.

It is contemplated that the status of the client active circuit may be transmitted to the host active circuit (and vice versa) by other means such that the host active circuit is notified of the presence of a client device. For example, in an alternative embodiment, a third conductor wire may be present in the fiber optic cable 102. Upon connection of a client device to the client active circuit, the client active circuit may transmit a client status signal to the host active circuit over the third conductor wire. The host active circuit may then close the host termination switch upon receipt of the client status signal. The client status signal may also be provided to an external circuit that may relay the client status signal to the host device.

Further, the active optical cable assembly may include one or more visual indicators such as an LCD or LED, thereby providing information such as data transfer in process, data transfer speed, port enable status, charging status and/or general client device status. By way of example, the LCD or LED may be exposed to the housing for visibility or they may illuminate one or more components that are exposed to the housing for visual indication to the user. The visual indicators may use any suitable color(s) and may be coded as desired and/or aesthetically shaped.

Additionally, the active optical cable assembly or other devices disclosed herein may optionally provide a debug device in the active assembly that acts as a separately enumerated virtual device that appears in parallel with any other client attached to the cable assembly. The debug device may be configured as read and/or write interface as desired. In other words, the user may simply use the debug device for determining information about system parameters and/or may use debug device for setting system parameters. The debug device may read and/or write system parameters directed to protocol, the transport state, fiber optic status, generally query information regarding the host and/or client and the like. By way of example, system parameters for the debug device interface may include bit error rate, total transmitted bit count, connection status, presence of VBUS, presence of external DC adapter, current drawn by client, optical link status, and the like. As examples of a write interface, the debug device can allow the user to control the LED/LCD visual indicator output such as intensity level, on-off state, or other custom outputs. Further, the virtual debug device can save one or more standard and/or custom user profiles for quick and easy use. Still further, each active optical cable assembly may also optionally include a unique identification (i.e., ID) programmed in during manufacture so that the cable assembly can be inventoried and tracked based on the ID.

Referring now to FIG. 6, a system 690 comprising a host device 880, a client device 980, and an active optical cable assembly 600 according to an alternative embodiment is illustrated. Rather then incorporating all of the components of the host active circuit 820 in the host connector, and all of the components of the client active circuit 920 in the client connector (e.g., as depicted in FIG. 1), some or all of the components of the host active circuit 820 and the client active circuit 920 may be maintained within a host adapter 800 and a client adapter module 900, respectively. The host adapter 800 and client adapter module 900 are configured to enable a fiber optic cable 602 to facilitate communication between a host device 880 and a client device 980 via USB 3.0.

According to the embodiment illustrated in FIG. 6, the host adapter module 800 generally comprises a host adapter housing 805, a host connector 860 (e.g., a connector similar in configuration to the host connector 110 illustrated in FIG. 1), and a host adapter input port 812. The active optical cable assembly 600 comprises a host adapter connector 610 that is optically coupled to the fiber optic cable 602, and a client adapter connector 710 that is also optically coupled to the fiber optic cable 602. The host adapter connector 610 may have a host connector end 660 that is configured to mate with the host adapter input port 812. The host connector 860 is configured to mate with a host input port 882 of the host device 880. It is noted that no limitations are intended to the male-female connector configurations of any of the connectors illustrated in FIGS. 1A and 6.

Similarly, the client adapter module 900 generally comprises a client adapter housing 905, a client connector 960, and a client adapter input port 912. The client adapter connector 710 may have client connector end 760 that is configured to mate with the client adapter input port 912. The client connector 960 is configured to mate with a client input port 982 of the client device 980. In one embodiment, the host adapter module 800 and the client adapter module 900 may have the same components such that they are adapter modules that may be utilized as either a host adapter module or a client adapter module.

The host connector end 660 and the client connector end 760 may or may not be configured as a USB connector. For example, the host adapter connector 610 and the client adapter connector 710 may be configured as optical connectors, or electrical connectors for use with a protocol other than USB. In the embodiment illustrated in FIG. 6, the host active integrated circuit 830 and the host transceiver circuit 850 are maintained within the host adapter module 800, and the client active integrated circuit 930 and the client transceiver circuit 950 are maintained within the client adapter module 900 such that all of the active components are maintained in the host adapter module 800 and the client adapter module 900. Therefore, the fiber optic cable 102 includes only optical fibers and conductors. The client connector end 760 and the host connector end 660 may be optical connections that optically couple the fiber optic cable 102 to the client adapter module 900 and the host adapter module 800, respectively. In this manner, the fiber optic cable 102 may be a passive component because the active components (e.g., the transceiver circuits and active integrated circuits) are not maintained therein. In this embodiment, the fiber optic cable 102 is not dedicated to any one particular communications standard or protocol, and may be utilized with any communication standard.

In another embodiment, the transceiver circuits 850, 950 are maintained within the fiber optic cable 602 and host and client interface circuits 830, 930 are maintained within the host and client adapter modules 800, 900, respectively. More particularly, the host transceiver circuit 850 is maintained within the host adapter connector 610 of the fiber optic cable 102, the host active integrated circuit 830 is maintained within the host adapter module 800, the client transceiver circuit 950 is maintained within the client adapter connector 710 of the fiber optic cable 102, and the client active integrated circuit 930 is maintained within the client adapter module 900. Therefore, the host adapter module 800 and the client adapter module 900 act as a protocol interface to the transceiver circuits 850, 950 within the fiber optic cable 602. The host and client interface circuits may or may not be the host active circuit 830 and the client active circuit 930 as described herein. For example, the host and client interface circuits may be configured to act as a protocol interface circuit to the fiber optic cable using standards other than USB 3.0. In this manner, the host and client adapter modules 800, 900 may be utilized to adapt legacy protocols (e.g., USB 3.0) for use with a low-cost fiber optic cable. Also in this embodiment, the fiber optic cable 102 is not dedicated to any one particular communications standard or protocol, and may be utilized with any communication standard.

The protocol interface circuit within the adapter housing may receive native electrical signals from the host and/or client device in accordance with a communications protocol (e.g., USB 3.0 electrical signals), and adapt the native electrical signals such that the adapted electrical signals may be compatible with a transceiver circuit that converts the electrical signals into optical signals. Similarly, the protocol interface circuit may receive and convert adapted electrical signals (adapted electrical signals that have been converted from optical signals received over the fiber optic cable) into converted electrical signals that are compatible with one or more particular protocols. In this manner, the protocol interface circuit or circuits may act as an interface between legacy or future communications protocols and the transceiver circuits. As described above, the transceiver circuit may be positioned within a fiber optic cable connector or within the adapter housing. In one embodiment, the host adapter and/or the client adapter may be operable to adapt and convert signals in accordance with a plurality of protocols or standards through the use of different interface circuits that may be selectively activated depending on the protocol that is currently being utilized by the host and/or client device.

The host adapter module 800 and the client adapter module 900 may also be configured to have a plurality of host adapter input ports 812 and client adapter input ports 912, respectively, such that the host adapter module 800 and/or the client adapter module 900 may act as a hub into which a plurality of fiber optic cables 102 may be coupled.

It is noted that terms like "typically," when utilized herein, are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the terms "approximately" and "about" are utilized herein to represent the inherent degree of uncertainty that may be attributed to any quantitative comparison, value, measurement, or other representation.

What is claimed is:

1. An integrated circuit for facilitating communication between a host device and a client device over a fiber optic cable comprising an optical fiber, the integrated circuit comprising:
   a termination impedance coupled to a device input line; and
   a termination switch coupled to the termination impedance and a ground reference potential;
   wherein:
     when the integrated circuit is connected to a host device, the termination switch closes upon a connection between a client-side integrated circuit and a client device to couple the termination impedance to the ground reference potential; and
     when the integrated circuit is connected to a client device, the termination switch closes upon a connection between a host-side integrated circuit and a host device to couple the termination impedance to the ground reference potential.

2. The integrated circuit of claim 1 further comprising:
   a power management module comprising a power input operable to receive a voltage and the ground reference potential and a power output operable to output the voltage and the ground reference potential;
   a device interface input module operable to be coupled to a laser diode circuit;
   a device interface output module comprising a termination detect line, the device interface output module operable to be coupled to a photodiode circuit;
   wherein:
     the device input line is coupled to the device interface input module;
     the termination impedance is coupled to the device interface input module;
     when the integrated circuit is coupled to a host device:
       the power management module receives the voltage and the ground reference potential from the host device;
       the device interface input module is coupled to a host output driver of the host device;
       the device interface input module is coupled to a host input driver of the host device; and
       the termination switch closes upon a receipt of a client status signal indicating a connection of a client device to the client-side integrated circuit, thereby enabling the termination impedance; and
     when the integrated circuit is coupled to a client device:
       the power management module receives the voltage and the ground reference potential from the host-side integrated circuit;
       the device interface input module is coupled to a client output driver of the client device;

the device interface output module is coupled to a client input driver of the client device, detects a client input termination impedance of the client device, and produces a termination detect signal on the termination detect line when the client input termination impedance is detected; and the termination switch closes upon receipt of the voltage from the host-side integrated circuit, thereby enabling the termination impedance.

3. The integrated circuit of claim 2 wherein the laser diode circuit and the photodiode circuit are integral with the integrated circuit.

4. The integrated circuit of claim 2 wherein the power management module provides the client status signal to an external circuit upon the production of the termination detect signal by the device interface output module when the integrated circuit is coupled to the client device.

5. The integrated circuit of claim 4 wherein the client status signal comprises an optical signal.

6. The integrated circuit of claim 4 wherein the client status signal comprises an electrical signal.

7. The integrated circuit of claim 4 wherein the client status signal comprises the termination detect signal.

8. The integrated circuit of claim 1 wherein the integrated circuit detects whether it is electrically coupled to a host device or electrically coupled to a client device.

9. An integrated circuit for facilitating communication between a host device and a client device over an active cable assembly, the integrated circuit comprising:

a termination impedance coupled to a device input line; and a termination switch coupled to the termination impedance and a ground reference potential;

wherein:

when the integrated circuit is connected to a host device, the termination switch closes upon a connection between a client-side integrated circuit and a client device to couple the termination impedance to the ground reference potential; and when the integrated circuit is connected to a client device, the termination switch closes upon a connection between a host-side integrated circuit and a host device to couple the termination impedance to the ground reference potential.

10. The integrated circuit of claim 9 further comprising:

a power management module comprising a power input operable to receive a voltage and the ground reference potential and a power output operable to output the voltage and the ground reference potential;

a device interface input module operable to be coupled to a laser diode circuit;

a device interface output module comprising a termination detect line, the device interface output module operable to be coupled to a photodiode circuit;

wherein:

the device input line is coupled to the device interface input module;

the termination impedance is coupled to the device interface input module;

when the integrated circuit is coupled to a host device:

the power management module receives the voltage and the ground reference potential from the host device;

the device interface input module is coupled to a host output driver of the host device;

the device interface input module is coupled to a host input driver of the host device; and the termination switch closes upon a receipt of a client status signal indicating a connection of a client device to the client-side integrated circuit, thereby enabling the termination impedance; and when the integrated circuit is coupled to a client device:

the power management module receives the voltage and the ground reference potential from the host-side integrated circuit;

the device interface input module is coupled to a client output driver of the client device;

the device interface output module is coupled to a client input driver of the client device, detects a client input termination impedance of the client device, and produces a termination detect signal on the termination detect line when the client input termination impedance is detected; and the termination switch closes upon receipt of the voltage from the host-side integrated circuit, thereby enabling the termination impedance.

11. The integrated circuit of claim 10 wherein the laser diode circuit and the photodiode circuit are integral with the integrated circuit.

12. The integrated circuit of claim 10 wherein the power management module provides the client status signal to an external circuit upon the production of the termination detect signal by the device interface output module when the integrated circuit is coupled to the client device.

13. The integrated circuit of claim 12 wherein the client status signal comprises an optical signal.

14. The integrated circuit of claim 12 wherein the client status signal comprises an electrical signal.

15. The integrated circuit of claim 12 wherein the client status signal comprises the termination detect signal.

16. The integrated circuit of claim 9 wherein the integrated circuit detects whether it is electrically coupled to a host device or electrically coupled to a client device.

* * * * *